June 30, 1970  B. J. BEUSINK  3,517,495
MOWING MACHINE
Filed April 14, 1967  6 Sheets-Sheet 1
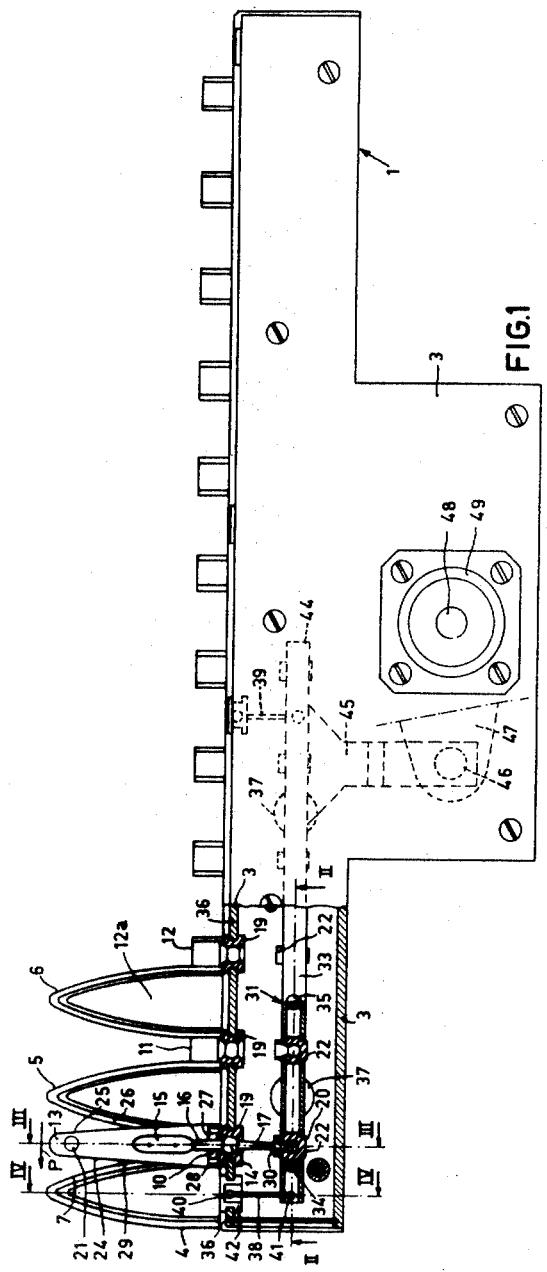
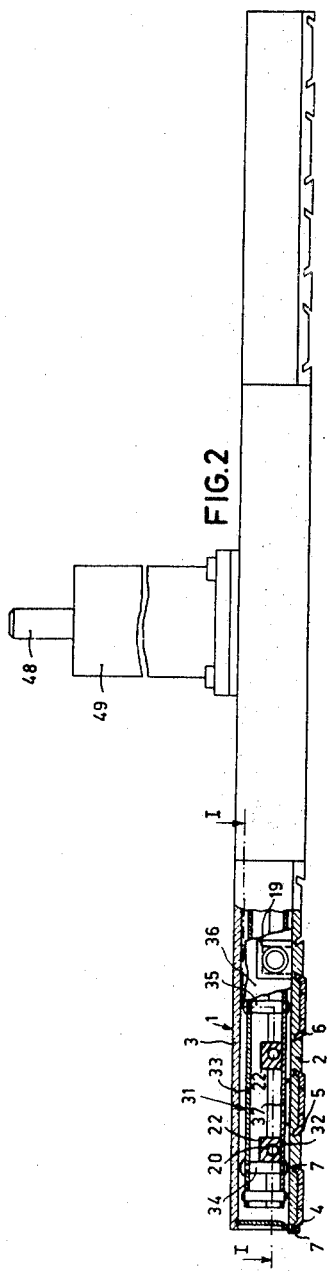
INVENTOR.
BERNARD BEUSINK
BY
AGENT

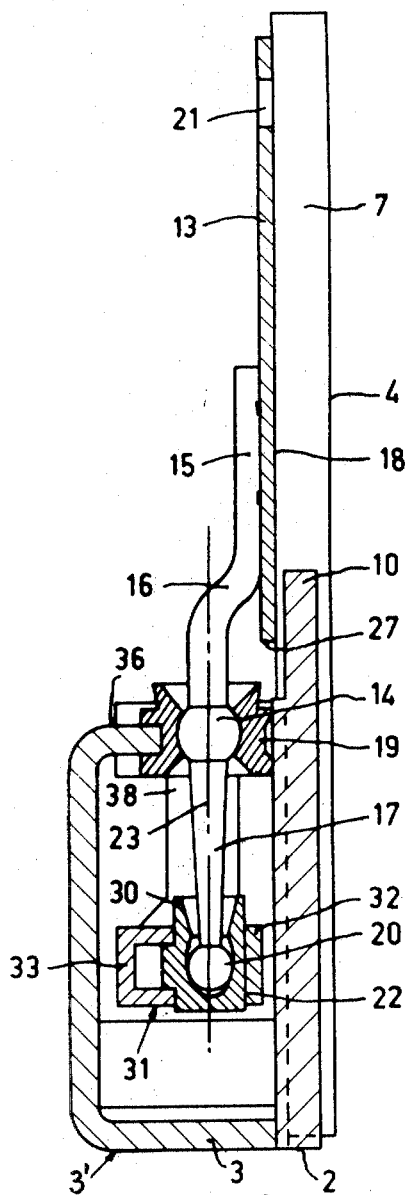
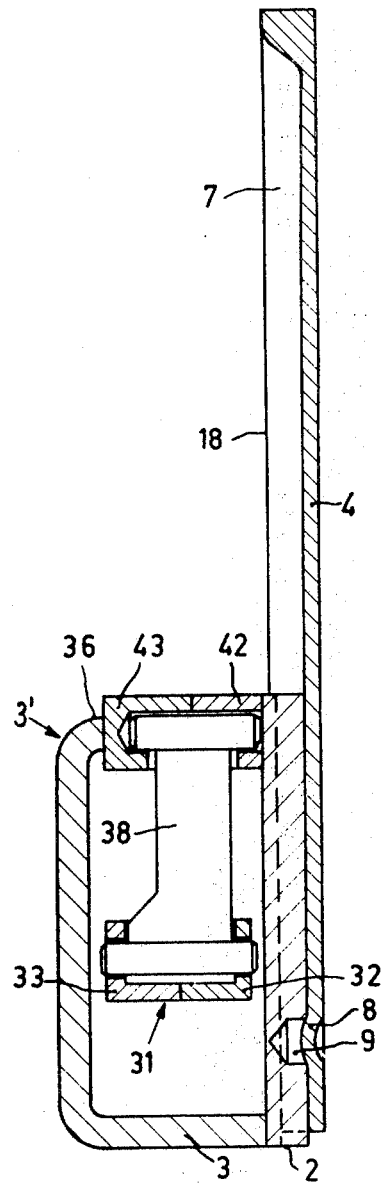

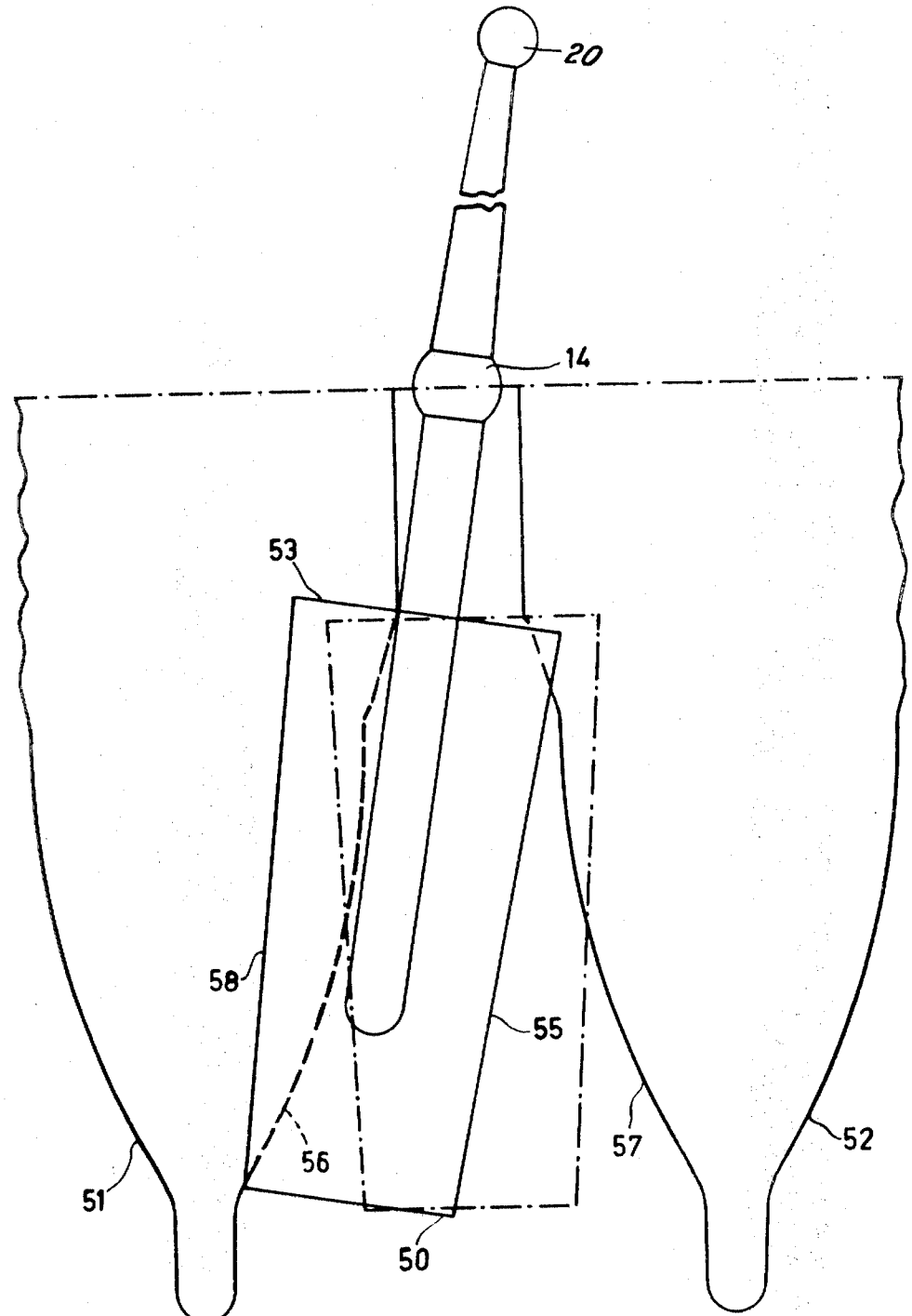

United States Patent Office 3,517,495
Patented June 30, 1970

3,517,495
MOWING MACHINE
Bernard Joseph Beusink, Oerle, Netherlands, assignor, by mesne assignments, to U.S. Philips Corporation, New York, N.Y., a corporation of Delaware
Filed Apr. 14, 1967, Ser. No. 630,952
Claims priority, application Netherlands, Apr. 16, 1966, 6605142
Int. Cl. A01d 55/08
U.S. Cl. 56—296               7 Claims

ABSTRACT OF THE DISCLOSURE

An arrangement of alternately spaced, fixed and movable cutter blades for a mowing machine. Each of the movable blades reciprocates between two fixed blades and is mounted to permit a longitudinal tilting movement of the blade so as to exert a pressure on the two cutting edges of the respective movable and fixed blade during the cutting operation.

This invention relates to mowing machines, in particular to an arrangement for the cutting blades thereof.

The reciprocating or oscillating type mowing machines of the prior art usually have a set of fixed cutter elements and a set of movable cutter elements and during the cutting operation or "scissors action" there is frictional contact between the movable cutter elements and the fixed cutter elements. This contact results in reduction of the efficiency of the cutting operation and in undue wear on the blades necessitating more frequent sharpening of the blades and a higher rate of blade replacement.

The mowing machine of this invention has a lower row of fixed cutters and a row of movable cutters placed above and between the fixed cutters. The movable cutters are connected to a reciprocating drive bar and during operation the cutters are simultaneously moved, each cutter being pivoted about a spherical pivot positioned in a bearing block. When an object to be cut such as grass is actually engaged between the movable and fixed blades a special and additional movement has been added to the movable blades namely a tilting movement around the longitudinal axis of the blade. This tilting movement is caused by the reaction forces exerted on the cutting edge during the cutting operation. The tilting tends to press or urge the cutting edge of the movable blade and the fixed blade against each other for a more effective "scissors type" cutting action; at the same time the opposite cutting edge of the movable cutter i.e. the edge which is not at this instant engaged in a cutting operation is lifted, by the tilting movement, away from the fixed blade adjacent thereto. It should also be noted that when the cutters are not engaged in the normal cutting operation, as when no grass is being cut, the movable blades will reciprocate but will not tilt thus reducing or completely eliminating contact between the movable and fixed blades with a resultant reduction of wear on the blades.

An object therefore of this invention is to produce an arrangement of cutter blades for a mowing machine which will provide a more effective cutting action.

Another object of this invention is to provide a cutter arrangement which will require a lower consumption of mower energy during operation.

A further object of this invention is to provide a cutter arrangement which will considerably reduce the wear on the cutter blades.

The above and other objects, features and advantages of the present invention will be apparent from the following description of the preferred embodiments when considered in connection with the accompanying drawings wherein:

FIG. 1 shows a plan view of the cutter bar of a mowing machine according to the invention, part of which is shown in a horizontal sectional view taken on the line I—I of FIG. 2.

FIG. 2 is a rear view of the device of FIG. 1, partly in a vertical sectional view taken on the line II—II in FIG. 1.

FIG. 3 is a cross sectional view taken on the line III—III in FIG. 1.

FIG. 4 is a cross sectional view taken on the line IV—IV in FIG. 1.

FIG. 5 shows on an enlarged scale a plan view of a movable cutter with the outlines of fixed lower cutters co-operating therewith.

Figure 6:
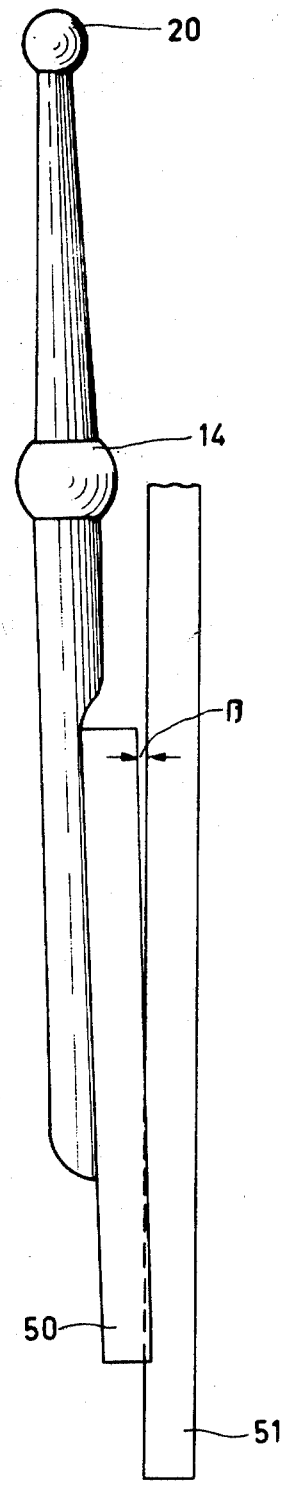
FIG. 6 is a side elevation associated with FIG. 5

FIGS. 1 to 4 show a cutter bar 1, formed by a ground plate 2, which, together with the superposed cap 3, constitutes a box-shaped, closed housing 3'. Cutters such as 4, 5 and 6 are secured to the lower side of the cutter bar 1 at equal distances from each other so as to protrude forwardly. By their edges bent over obliquely in upward direction (designated by 7 for the cutter 4) which edges are parallel to each other along the back-most portion, the cutters are inserted with clamping force into corresponding slots of the lower side of the ground plate 2 until a depressed cam 8 snaps into a cavity 9 (FIG. 4). They are furthermore supported laterally by cams, for example designated by 10, 11 and 12 in FIGS. 1 and 3 protruding from the ground plate 2.

The lower row of fixed cutters co-operates with a higher row of cutters, one of which is designated by 13 in FIGS. 1 and 3. The cutters of the higher row are disposed each with a pivotal point 14 centrally between a pair of cutters, for example 4 and 5, of the lower row, so that during the pivotal movement about the point 14 they co-operate alternately with the cutting edges 7 of said two adjacent lower cutters. From the sectional view of FIG. 3 it will be seen that each upper cutter 13 is formed by a flat cutting plate, to which a rod-shaped driving arm 15 is welded. Through a sharp bend 16 and a spherical face 14 on the rod the arm 15 terminates in an end portion 17, which is accommodated inside the housing 3' of the cutter bar 1 and located above the ground face of the cutting plate 13, which is located in this case in the working plane of the mower, where the stalks are cut on the land level. The spherical pivotal point 14 is located in a bearing block 19, which is enclosed in the wall of the housing 3'. To the end portion 17 of the driving arm 15 is transferred the driving force for the pivotal movement of the cutter 13 through the spherical end 20. For this purpose said rear end 20 is caused to perform a reciprocatory movement in a manner to be described more fully hereinafter.

The front end of the cutter 13 is provided with an opening 21 to permit the withdrawal of the cutter 13, for example, by inserting a hook-shaped tool and pulling the same. Since the bearing block 19 of the driving arm 15 is made of an elastic synthetic resin, the ball 14 and hence the arm 15 can be removed from or inserted into the block 19 by pulling the cutter 13 in an axial direction and by pushing it respectively. In a similar manner the bearing block 22 allows this manipulation for the spherical face 20.

Since the working plane 18 is located, in the manner described, beyond the centre line 23 of the end portion 17, going through the driving point 20 and the pivotal point 14, the cutter tends to tilt around said centre line or tilting axis 23, as during the cutting operation as soon as a slight force of resistance is exerted on the cutting edge. This force is formed by the friction between the cutting edges of the cutter 13 and lower cutter 5 and by the resistance exerted by the grass stalks to be cut, as they come into contact with the cutting edges. The two forces have their points of application in the lower face 18 of the cutting plate 13, at right angles to the plane of the drawing in FIG. 3. The resultant tilting moment tending to tilt the cutter 13 around the tilting axis 23 urges the cutting edge 24, upon movement of the cutter in the direction of the arrow P, toward and against the cutting edge 7 of the lower cutter 4 by a force which increases with the increasing resistance in mowing. At the same time the cutting edge 25, is lifted from the cutting edge 26 of the cutter 5 by the tilting movement. The pressing force during the tilting depends upon the resistance encountered in mowing and will provide effective cutting of the stalks. The opposite cutting edges are simultaneously tilted out of contact with the lower cutters and no loss of energy occurs, so that the mowing machine can be driven with a lower power supply than in conventional mowers.

It has been stated that the lower cutters 4, 5 and 6 are provided with upright lateral rims 7, which serve for fastening the cutter in the portion located beneath the base plate 2 of the cutter bar 1, where they extend parallel to one another one on each side of each cutter. Along the portion projecting from the cutter bar in FIG. 1 they form cutting edges on the lower central portion 12a. This "dish" shape of the lower cutters facilitates the tilting movement of the cutters and permits for extended use and reduced wear. With respect to the distance between the cutters 4 and 5 the rear edge 27 of the cutter 13 has a width such that in the outermost pivotal positions to the left and to the right, a corner of said rear edge is sill supported by the cutting edge 7 of the adjacent cutter towards which the cutter 13 is moving, so that no interference between the cutters will be encountered. During movement in the direction of the arrow P, the position shown in FIG. 1 indicates that the cutting edge 24 of the cutter 13 projects inwardly beyond the cutting edge 7 of the cutter 4 from the corner 28 up to the working point 29, where it engages the cutting edge 7. It will be obvious that the rearmost portion of the cutting edge 24 of the upper cutter 13, having performed its cutting operation can enter the disc-shaped space 12a inside the lower cutter 4 during the tilting movement toward the cutter and as the point 29 of the upper cutter 13, located more forwardly, performs a cutting operation together with the cutting edge 7 of the lower cutter 4. In other words, owing to the disc-shape of the lower cutter 4 the tilting movement is not hindered, because the portions of the edge 24 of the cutter 13 which are situated behind the working point 29 of the cutter do not interfere with the lower cutter 4.

As stated above, the ball joint 14 is journalled in the wall of the housing 3' as is the other bearing or frictional surfaces for the drive so that satisfactory lubrication and protection are ensured. The bearing block 22 of synthetic resin for the driving point or spherical end 20 is conically widened towards the front end 30 (see also FIG. 3), so that the insertion of the spherical driving end is facilitated. The bearings 22 are accommodated in a hollow driving beam 31 of rectangular cross-section and comprised of two channel members, 32 and 33, the hollow sides of which face each other and are fastened to each other by bolts, 34 and 35. The bearing blocks 22 are inserted into slots in the rims of the channels 32 and 33 and enclosed therebetween. The bearing blocks 19 are held on the base plate 2 in grooves formed in the rim of the cap 3.

The driving beam 31 is slidably arranged on plates 37 and is pivotably supported near the ends relatively to the cap 3 by a pair of links 38 and 39. Said links are adapted to turn around pivots, such as 40 and 41 for the link 38. The pivot 40 is journalled in two blocks 42 and 43, which are inserted like the bearing blocks 19, into slots of the front wall 36 of the cap 3. The driving beam 31 thus imparts the same pivotal movement to the driving points 20 and the cutters 15.

The driving beam 31 terminates at 44 (FIG. 1) near the central plane of the cutter bar 1. The right-hand half of the housing 3' of the cutter bar comprises a driving beam of similar structure (not shown), which is arranged in mirror-picture fashion with respect to the driving beam 31.

With the driving beam 31 is connected a catch 45 (indicated by broken lines in FIG. 1), which is pivoted at 46 to an eccentric arm 47, which co-operates with an eccentric disc (not shown), on the driving shaft 48. This shaft 48 is accommodated in a housing portion 49, secured to the housing 3' which accommodates an electric driving motor; however, the mode of driving may be chosen at will. The said driving beam not shown for the right-hand group of pivotable cutters which are driven in a similar manner by way of a second eccentric disc arranged on the shaft 48 with a shift of 180° with respect to the first-mentioned eccentric disc. Therefore, the cutter movements have a difference of half a period on either side of the central plane of the cutter bar, so that the drive is well balanced out.

In the construction of the cutter bar so far described the tilting axis 23 (FIG. 3) extends parallel to the working plane 18 and to the plane of the cutter 13. In order not to hinder the tilting movement, the lower cutters have a disc-shaped construction. However an arrangement is possible in which flat cutting plates rather than disc shaped plates may be employed for the upper and lower cutters.

FIGS. 5 and 6 show a cutter 50, adapted to pivot about the pivotal point 14 and constructed similar the counter-cutters 51 and 52, in the form of a flat plate (the thickness is shown on an enlarged scale) such that the intersection of their cutting surfaces forms an angle $\beta$. The upper faces of which are located in the working plane where the stalks are cut. The cutter 50 is positioned above the corner 53 on the upper face of the cutter 51, to prevent interference during a movement of the cutter 50 from left to right.

Figure 7:
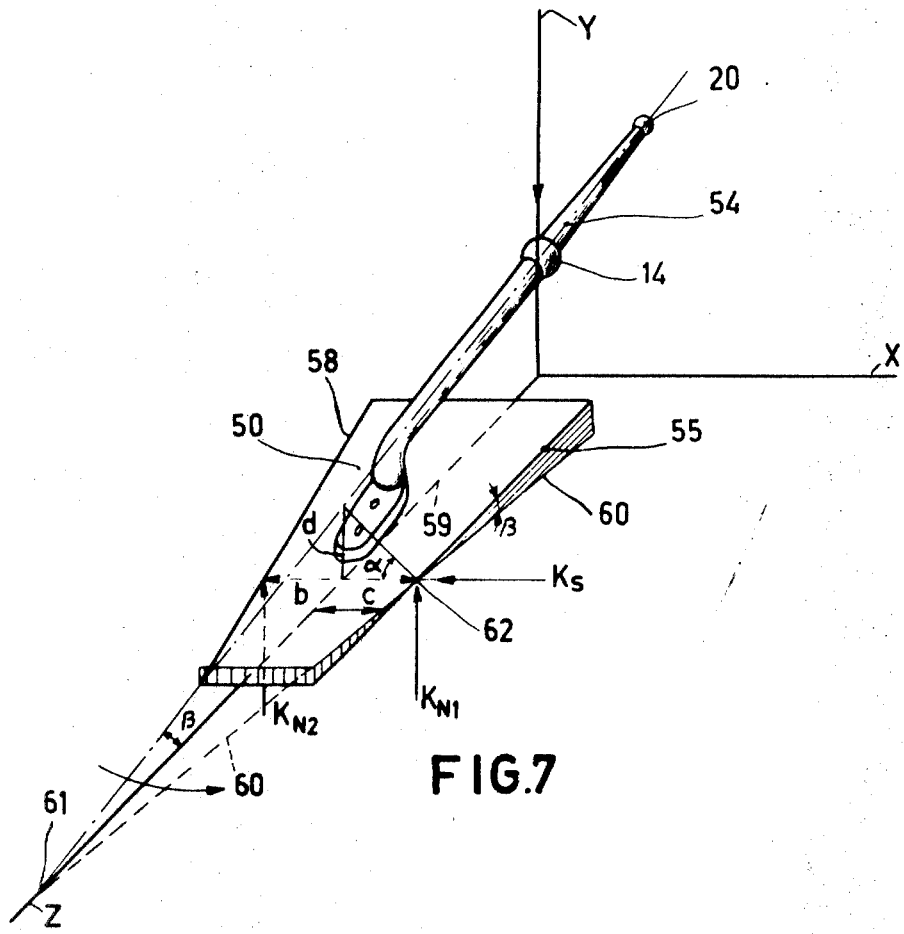
FIG. 7 is a perspective view of a movable cutter in a co-ordinate system.

FIG. 7 shows diagrammatically show cutter 50 in the form of a flat plate and relative to co-ordinate axes X, Y, Z. The ball bearing 14 being located on the Y axis, the XZ plane is the working plane in which the upper face of the lower cutter plates 51 and 52 are located. The centre line 54 going through the pivotal point 14 and the driving point 20 forms the tilting axis which is at an angle $\beta$ to the working plane XZ. The projection lines of the cutting edges of the cutter 50 onto the working plane XZ are indicated by cross hatching. It will be seen that the perpendicular from the contact point 62 of the upper and lower cutters to the tilting axis 54 is at an angle $\alpha$ to the plane of the cutter 50.

At the end of each pivotal stroke (for example after a turn to the left in FIG. 7), the operative cutting edge (in this case the cutting edge 55, see also FIG. 5) projects for the major part beneath the working plane XZ, whereas at the beginning of the stroke it projects for the major part above the same.

In order to allow this movement, and have the driving point 20 remain at the same level above the XZ plane, the shape of the cutting edges 56 and 57 of the lower cutters is made to accommodate the cutting edges 55 and 58. The width $b$ of cutter 50 at point 62 is of such a dimension that it will fit between the cutters 56 and 58.

The shape of the straight cutting edges 55 and 58 of the cutter 50 is chosen so that in a plane normal to the plane of the cutter 50 the distance $c$ of the projection of the cutting edge onto the working plane XZ from the projection 59 of the tilting axis 54 onto the working plane and the distance $d$ of the tilting axis 54 from the working plane decrease progressively in a direction away from the driving point 20. This means that the projections 60 of the cutting edge 55 and of the tilting axis 54 intersect each other at point 61. This result is described for point 62 in FIG. 7, where the width $b$ fits between the cutting edges 56 and 57 of the lower cutters.

Assuming the cutter to pivot to the left, the force $Ks$ (pressure of the stalks to be cut at the area concerned plus the frictional resistance) will produce the moment $d_1Ks$ and the reactive force of the pressure on the cutting edge of the lower cutter will produce the moment $c_1K_{N1}$. Accordingly, during the displacement of the point of intersection the moment arm $c$ decreases, also the moment $d$ arm decreases proportionally, so that the pressure of the cutting edges of the cutters against each other can be kept constant for a constant $Ks$ or in other words, the frictional losses under no-load conditions are constant throughout the path covered by the cutting edge of the moving cutter along the lower cutter. The value of the no-load friction may be chosen to be very low without the tilting movement along the cutting path being prevented in certain cutter positions.

Figure 8:
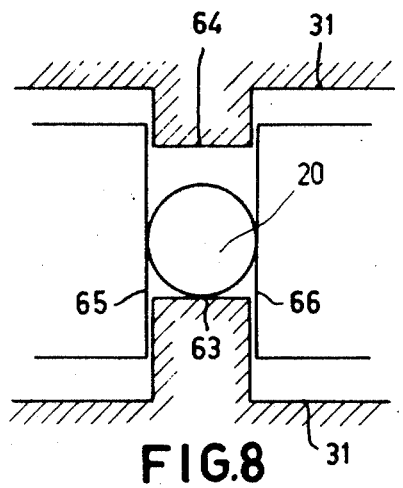
FIG. 8 is a diagrammatic view of the bearing of a cutter driving point.

FIG. 8 shows diagrammatically another method of positioning the ball driving point 20 in the driving beam 31. The ball 20 is enclosed with a small amount of vertical clearance between the supporting face 63 and the abutting face 64, the faces 65 and 66 form a lateral guide. The bearing can be used to support the ball bearing point 20 in place of the way shown in FIGS. 5, 6 and 7. The shape of the cutting edges of the lower and upper cutters is selected so that the displacement of the ball 20 is horizontal (parallel to the working plane). By utilizing the elasticity of various parts it can be ensured to some extent that even under no-load conditions an elastic pressure of the upper cutter on the lower cutter is obtained, so that clearances due to wear are compensated to some extent.

Figure 9:
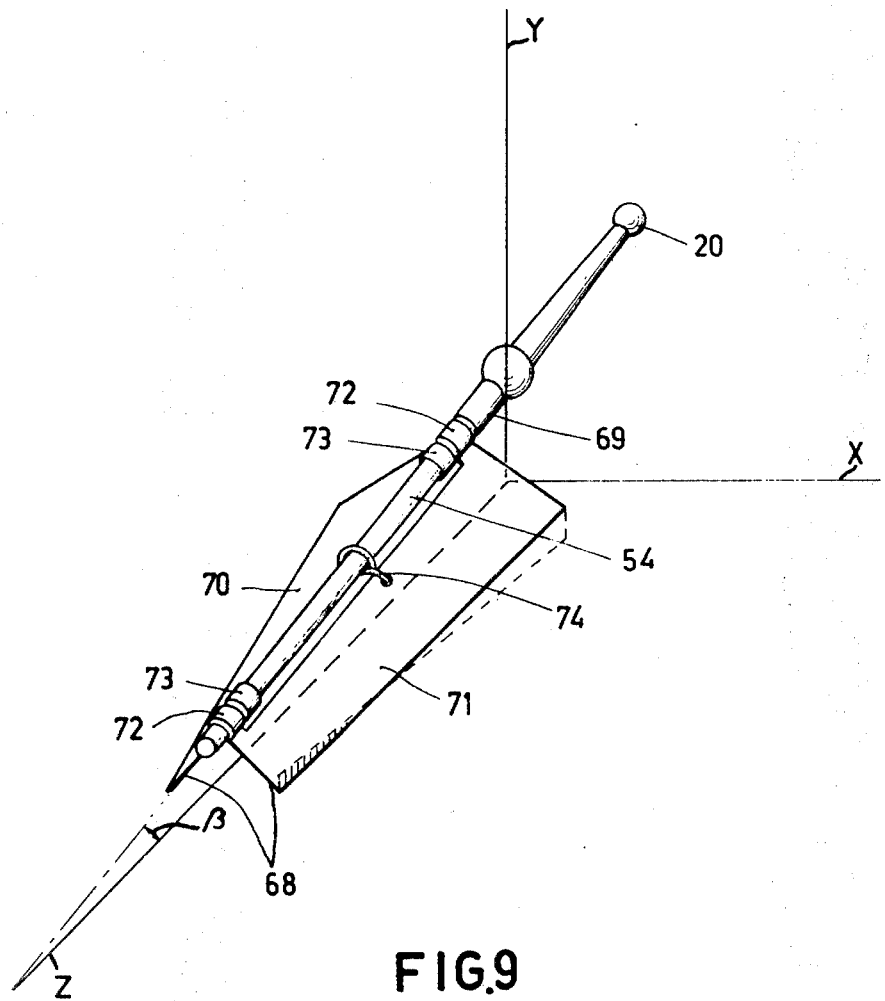
FIG. 9 is a diagrammatic perspective view of a further driven cutter.

An embodiment in which the restriction of the frictional losses is more accurately controlled is shown in FIG. 9, in which the movable cutter 68 is urged against the counter-cutters (in the plane XZ) by springs cooperating with the driving arm 69. For this purpose the movable cutter 68 is formed by the cutting plates 70 and 71, which are at an obtuse angle to each other. The planes of the cutting plates pass through the centre line 54 of the driving arm 69, that is to say, through the tilting axis. The plates are individually pivoted to the driving arm 69. The plate 71 is fastened by the pivots 72 and the plate 70 by the pivots 73. Springs, for example 74, provided on the arm 69 urge the cutting plates 70 and 71 with a slight pressure against the counter-cutters.

In this case the elastic force of pressure of the springs, for example, 74, can be chosen to be just sufficient for maintaining a contact between the upper cutter and the lower cutter. The frictional losses, even under no-load conditions, and wear are minimized.

The chosen angle of inclination $\beta$ of the tilting axis 54 remains constant, even after the cutting edges are worn out. The clearance due to wear is automatically compensated by the spring pressure; the driving point 20 requires only a simple bearing for a drive in a horizontal plane by the driving beam and the shape of the cutting edges of the fixed lower cutters need not be calculated especially in connection with the chosen shape of the cutting edges of the upper cutter 68.

What is claimed is:

1. A mowing machine comprising a cutter bar, a plurality of fixed cutter elements rigidly secured to said bar, a plurality of movable cutter elements having means for positioning and pivotally securing same to said bar and spaced with respect to the fixed cutter elements so as to permit a cooperative cutting action upon relative movement therebetween, said means including a driving arm affixed at one end to the movable cutter element, a spherical driving element located at the opposite end of the driving arm and secured within the cutter bar, driving beam means co-acting with said spherical driving element for producing a reciprocal movement of the cutter element, spherical pivotal means located on the driving arm intermediate said ends for supporting the cutter during reciprocal movement and also for permitting a simultaneous tilting movement of the cutter about the longitudinal axis of the driving arm, said tilting movement being generated by the reaction forces during the cutting operation which act directly on the movable cutter element.

2. An apparatus as claimed in claim 1 further comprising a plurality of bearing blocks positioned within the cutter bar, the blocks defining therein a bearing surface adapted for releasably accommodating the spherical driving elements and the spherical pivotal means respectively, said blocks further defining a flared opening adjacent said bearing surface for permitting insertion and removal of the respective spherical driving elements and spherical pivotal means from the cutter bar.

3. An apparatus as claimed in claim 2 wherein the surface of the movable cutter defines therein an opening and the bearing blocks are made of an elastic synthetic resin thus facilitating removal of the cutter by the combined effect of an axial force exerted by a tool inserted through the opening and the resiliency of the bearing blocks.

4. An apparatus as claimed in claim 2 wherein the fixed cutters are disk-shaped and comprise upright lateral rim means which serve as cutting edges and also provide support for the fixed cutters by engagement with the cutter bar.

5. An apparatus as claimed in claim 2 wherein both the movable and fixed cutter elements are formed of flat plates and are fixed to the cutter bar so that the respective planes containing both cutting edges of each of two cooperative cutters intersect at an angle to each other.

6. An apparatus as claimed in claim 2 wherein the movable cutter elements is resiliently urged toward the rigidly secured cutter element.

7. An apparatus as claimed in claim 6 wherein the movable cutter element is formed of two separate plates each mounted to an opposite side of the driving arm and urged toward the fixed cutter by a spring member.

References Cited

UNITED STATES PATENTS

| | | | |
|---|---|---|---|
| 29,999 | 9/1860 | Roney | 56—293 |
| 1,152,322 | 8/1915 | Knapp | 56—293 |
| 2,673,441 | 4/1954 | Sargent | 56—293 |
| 2,724,941 | 11/1955 | Zwiesler | 56—293 |
| 2,793,488 | 5/1957 | Strohm | 56—293 |

FOREIGN PATENTS 741,660  9/1943  Germany.

ANTONIO F. GUIDA, Primary Examiner